United States Patent [19]

Shoulders

[11] 3,915,414
[45] Oct. 28, 1975

[54] ROTATING AIRCRAFT AND AIRCRAFT CONTROL SYSTEM

[76] Inventor: Kenneth R. Shoulders, Star Rte. Box 88, Woodside, Calif. 94062

[22] Filed: May 6, 1974

[21] Appl. No.: 467,380

[52] U.S. Cl. ......... 244/77 D; 244/17.13; 244/17.19; 324/34 PS; 416/19; 416/20
[51] Int. Cl.² ........................................ B64C 13/50
[58] Field of Search .... 244/13, 17.11, 17.13, 17.19, 244/77 D, 77 A, 77 S, 77 VA, 12 D; 324/34 PS; 416/19, 20, 90 A

[56] References Cited
UNITED STATES PATENTS

| | | | |
|---|---|---|---|
| 1,133,660 | 3/1915 | Papin et al. ................. | 244/17.19 X |
| 2,845,623 | 7/1958 | Iddings ....................... | 244/77 DS X |
| 3,119,582 | 1/1964 | Kaufmann ................... | 244/77 DA |
| 3,211,397 | 10/1965 | Laing et al. .................. | 244/17.19 |
| 3,299,197 | 1/1967 | Cutler ......................... | 244/77 AVA X |
| 3,520,499 | 7/1970 | Ask .............................. | 244/17.13 X |
| 3,697,022 | 10/1972 | Autechaud et al. ......... | 244/17.13 |
| 3,777,304 | 12/1973 | Gulich et al. ................ | 324/34 PS |

Primary Examiner—Trygve M. Blix
Assistant Examiner—Barry L. Kelmachter
Attorney, Agent, or Firm—C. Michael Zimmmerman, Esq.

[57] ABSTRACT

An aircraft is described which in configuration is simply a pod from which a single wing extends. The aircraft flies by rotation within an air mass to produce lift with the wing. The rotation is obtained by jet flow from the trailing edge of the wing adjacent its tip, which jet flow is provided by a separately rotating impeller within the pod. The impeller also acts by centrifugal force to normally set a pitch plane for the wing of the craft. A detector which interacts with the magnetic field of the earth generates a signal which is indicative of the angular orientation of the aircraft at any time, and a synchronous sensing and remote control system is provided which takes into account such orientation in operating a control flap positioned in the jet stream as desired to change the plane of rotation and, hence, the direction of translational motion, of the rotating aircraft.

13 Claims, 13 Drawing Figures

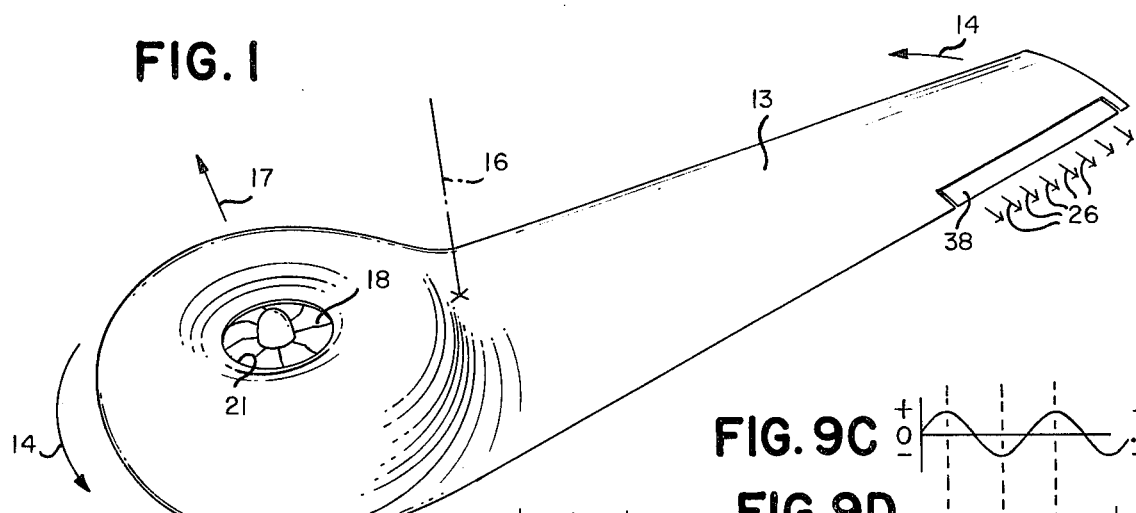
FIG. 1
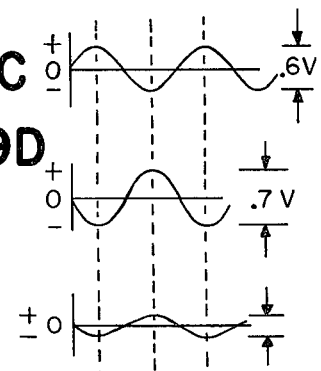
FIG. 9C
FIG. 9D
FIG. 9E
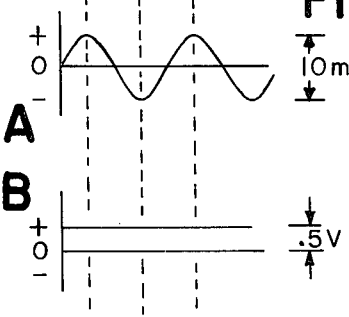
FIG. 9A
FIG. 9B
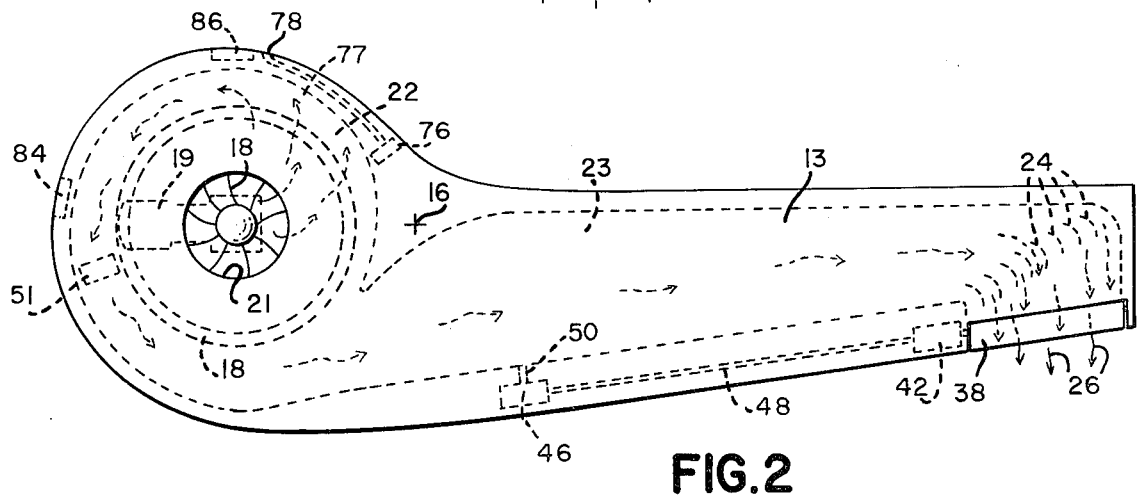
FIG. 2
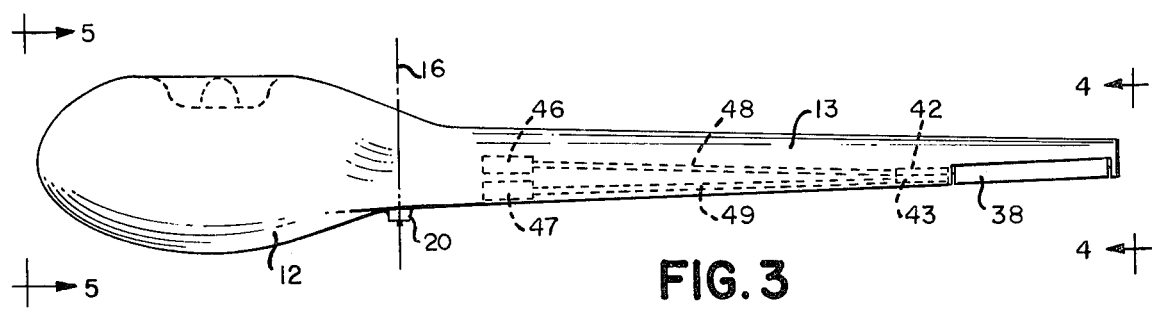
FIG. 3

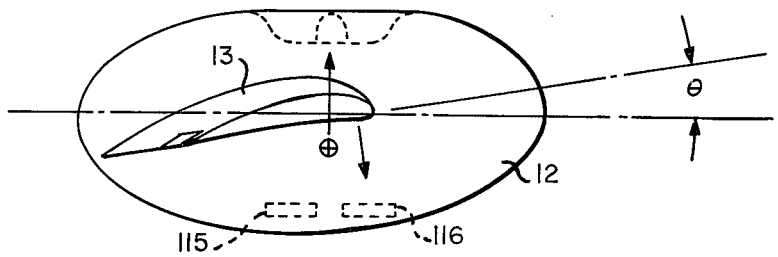
FIG.4   FIG.5
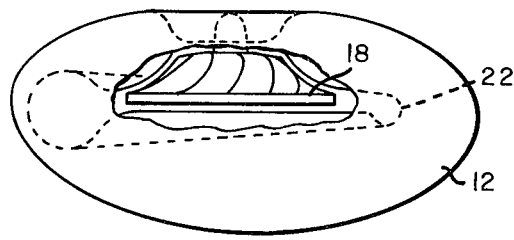
FIG.6
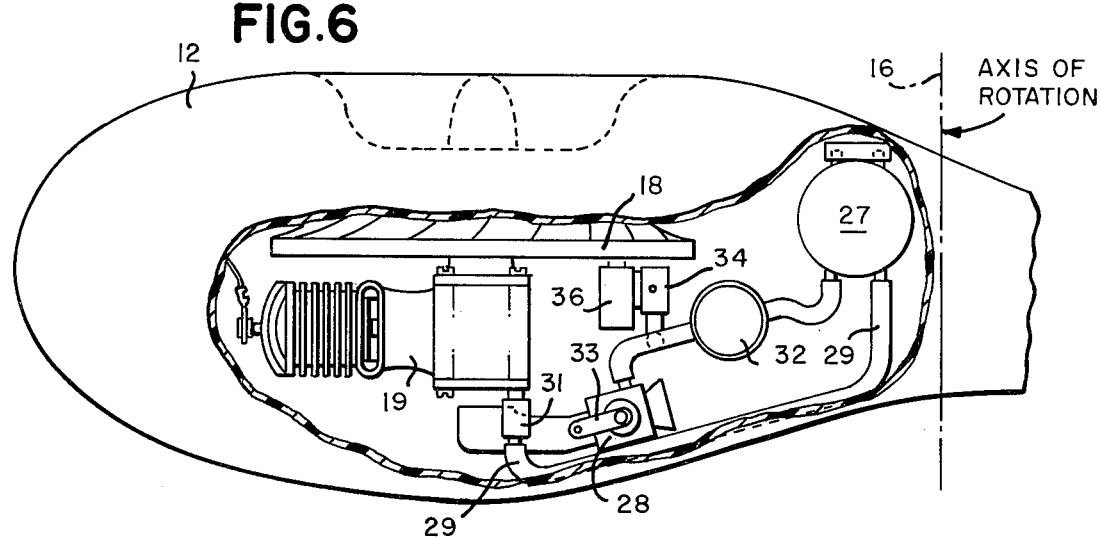
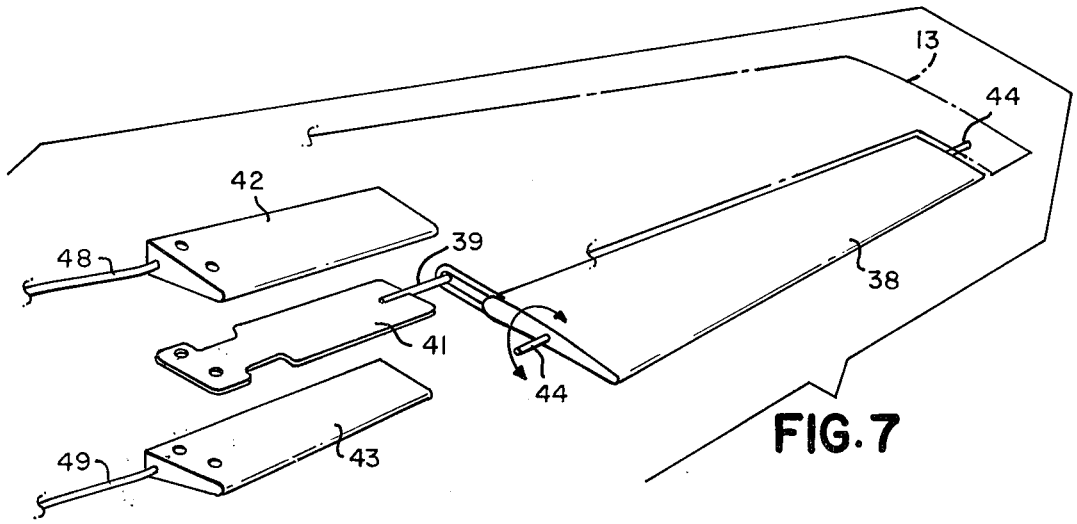
FIG.7

ROTATING AIRCRAFT AND AIRCRAFT CONTROL SYSTEM

BACKGROUND OF THE INVENTION

The present invention relates to aircraft and, more particularly, to a single wing rotating aircraft.

Powered rotorcraft which fly, the best example of which is the helicopter, are generally complex machines, as well as costly to obtain and maintain. One of the major causes of such complexity and other undesirable qualities is the necessity of controlling the attitude in space of such an aircraft. For example, helicopters require complex cyclic and collective control linkages which constantly change the relationship between each of its rotor blades and the medium through which the helicopter is flying to assure that the craft remains stable and is capable of control. Moreover, the sensing and control systems designed for directing the flight of such rotorcraft are also quite complex and expensive. For these reasons, as well as others, the uses to which presently available rotorcraft can be put are quite limited.

SUMMARY OF THE INVENTION

The present invention relates to an aircraft which includes a highly effective and yet simple mechanism for defining the attitude in space of such aircraft, as well as a heading detector and synchronous sensing and control system especially adapted for rotorcraft. In its most basic aspects, the aircraft comprises, as is usual, a body including means for producing a lift. However, it also includes a mass which is confined by the body for rotation in a plane, and means for rotating the mass at an angular velocity providing the mass with an angular momentum in its plane of rotation which is sufficiently great relative to the inertia of the remainder to the aircraft to set a pitch plane for the means providing lift. Such angular momentum of the mass will therefore control an initial attitude or, in other words, orientation in space, of the aircraft and damp any tendency to change such attitude. Most desirably, the aircraft further includes control means for selectively overcoming as desired the angular momentum of the mass to enable the attitude of the aircraft to be changed.

Because of its relative simplicity, the attitude control means for an aircraft discussed above plays a major role in making a single blade aircraft, the most efficient type of aircraft in terms in both lift and structural weight, a practical reality. In a preferred embodiment, the rotating mass which generates the angular momentum is an impeller which also generates air pressure for aircraft thrust. Also, the flying blade or wing is most desirably made a rotating one so that the aircraft will have the capability of hovering and can be designed to automatically convert into autorotation descent in the event of a power failure.

The invention also includes a synchronous system for controlling the direction of flight of an aircraft in which the lift producing means, e.g., an airfoil, is rotated. Such synchronous system includes means, such as a flap or jet stream, for varying the scalar value of the lifting force on the lift producing means at a location thereon which is spaced from its axis of rotation to thereby cause a torque to be applied to such lift producing means tending to change the plane of rotation. The synchronous system includes means, such as the heading detector to be described, for generating a signal indicative of the angular orientation or, in other words, location of the lift producing means in its plane of rotation at any instant in time, means for receiving a command signal indicative of a direction of flight desired for the aircraft, means for combining the generated signal and the command signal to produce a control signal indicating the timing and direction of changes required in the scalar value of the lifting force at the aforesaid location of the lift producing means to change the attitude of the lifting means to one conforming with the desired direction of flight, and means for applying such control signal to the means for varying the scalar value of the lifting force. The result will be that the plane of rotation or, in other words, the attitude of the aircraft will be changed as necessary to correspond the actual heading of the aircraft to that commanded.

Most desirably, the means for combining the generated signal indicative of the angular orientation of the lift producing means at any instant of time with the command signal is a summation point to which a signal indicative of the speed of the aircraft in a desired direction is also fed. A single control signal is thus generated embodying information on both the direction of flight and the speed of such flight in such direction. The synchronous system also most desirably includes a simple height sensing and control arrangement which compares the height at any time at which the aircraft is flying with a desired height and generates a control signal for corresponding the two.

The detector for determining the angular orientation of the rotating lift producing means is most simply an electrical conductor which is mounted for rotation with such lift producing means and cuts across the magnetic lines of force of earth's, for example, magnetic field. The result will be that a current will be generated within the electrical conductor which has a value at any instant in time indicative of the angular orientation of such conductor and, hence, of the rotating lifting means relative to the magnetic lines of force. Because the direction of such magnetic lines of force with respect to planetary directions is known, the angular orientation of the lift producing means at any particular time is provided. It will be recognized that the current which is generated will be sinusoidal current having a full 360° wave upon rotation of the detector across the magnetic field lines through 360° of orientation.

The invention includes many other features and advantages which will become more apparent or will be described in connection with the following description of a preferred embodiment.

BRIEF DESCRIPTION OF THE DRAWINGS

With reference to the accompanying three sheets of drawing:

FIG. 1 is a perspective view of a preferred embodiment of a cold jet powered rotorcraft incorporating the invention;

FIG. 2 is a plan view of the rotorcraft of FIG. 1 illustrating in phantom some details of its attitude defining and thrust-producing mechanism;

FIG. 3 is a side elevation view of the rotorcraft of FIG. 1 showing further details of its aerodynamic configuration;

FIG. 4 is an end view looking from a plane indicated by the lines 4—4 in FIG. 3 showing the relationship of its wing to the remainder of the aircraft;

FIG. 5 is an end view looking from the plane indicated by the lines 5—5 of FIG. 3 illustrating the relationship of a portion of the mechanism to the body shell;

FIG. 6 is an enlarged, partial and broken-away view of the aircraft body illustrating further details of the aircraft mechanisms;

FIG. 7 is an enlarged and exploded perspective view of a portion of the mechanical control mechanism;

FIGS. 9A–9E depict various signals produced by the synchronous detection and control system.

DETAILED DESCRIPTION OF A PREFERRED EMBODIMENT

Figure 8:
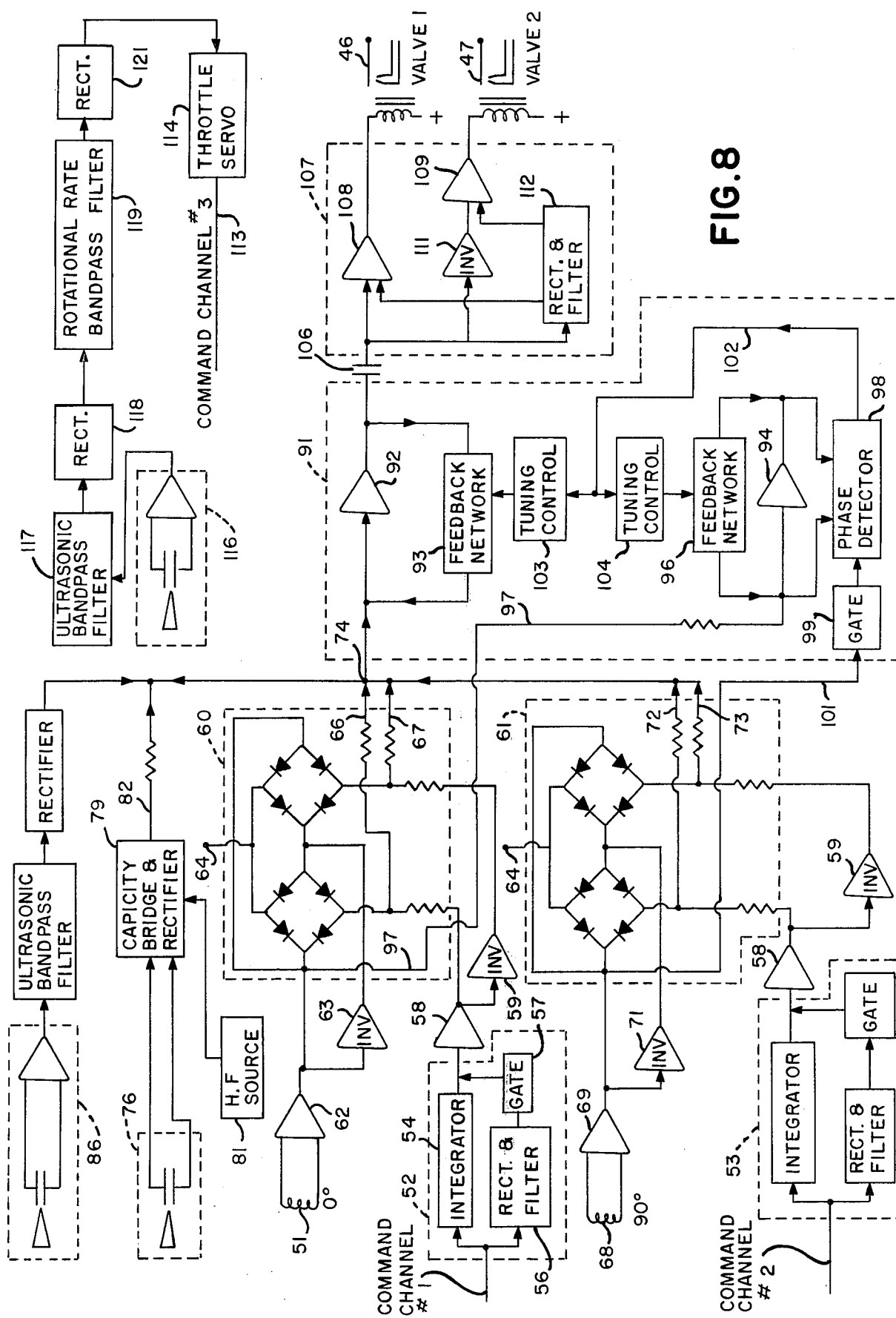
FIG. 8 is a schematic and block diagram of a preferred electrical embodiment of the synchronous detection and control system of the invention.

With reference first to FIG. 1, an aircraft incorporating the invention is generally referred to by refernce numeral 11. Such aircraft is a rotorcraft including a main housing or pod 12 from which extends on one side a single wing or blade 13 which acts, in effect, as means for producing lift for such aircraft. The wing is fixed relative to the pod 12, making the wing akin to a rigid rotor helicopter or autogyro.

In flight, the rotorcraft rotates as indicated by the arrows 14 about an axis 16 which passes through its center of mass. The aircraft will also move translationally during flight if its attitude in space (orientation of its plane of rotation) deviates from the horizontal in the same manner as, for example, the rotor disc of a helicopter. A typical direction of translational motion for the rotorcraft is indicated in FIG. 1 by the arrow 17.

It will be recognized that in an aircraft as described the pitch plane of the wing at any given time will detemine the flight characteristics of the aircraft. For example, a pitch plane normally providing a relatively high angle of attack is required before the rotorcraft will generate sufficient lift to ascend. A pitch plane normally providing an angle of attack of a lesser defree would be required for autorotation. As a particularly salient feature of the instant invention, it includes a highly simple arrangement for defining the pitch plane of the wing. More particularly, it has been found that the centrifugal force generated by a rotating body is directly usable to control the pitch plane of the wing. To this end, the rotorcraft includes a mass in the form of an impeller 18 which is confined within the body of the rotorcraft for rotation in a plane which, in this preferred embodiment, is coincident with the plane of rotation it is desired for the rotorcraft. Means in the form of a simple two-cycle engine 19 is provided for rotating the impeller. The mass and angular velocity at which the impeller is rotated combine to provide the impeller with an angular momentum in its plane of rotation sufficiently great relative to the inertia and aerodynamics of the remainder of the aircraft to set a pitch plane for the wing. As used herein the term "inertia" is meant to include where applicable both translational and rotational inertia, and represent the resistance offered by a body to a change of its state of rest or motion.

There are certain relationships which are important for efficient flight and to allow the rotorcraft to automatically go into autorotation descent when the impeller 18 is not rotating and the aircraft is not otherwise powered for flight. For one thing, the wing 13 has a positive camber airfoil configuration and a negative pitching moment. An appropriate wing is one having an airfoil section at its root similar to an NACA 4420 and tapering uniformly therefrom to an NACA 4415 section at its tip. Moreover, to enable differing values to thrust to control whether or not the aircraft is climbing or descending, the wing has a positive angle of attack, e.g., about 10°, relative to the plane of rotation of the rotorcraft when it is undergoing powered flight. This angle of attack is schematically depicted in FIG. 4 by the angle $\theta$. As stated before, the wing is provided with negative pitching moment. However, the masses associated with the aircraft are arranged to provide a centrifugal couple which counteracts the pitching moment of the blade when the aircraft rotates, regardless of the rotational speed. They can be so arranged since the centrifugal couple of such masses and the pitching moment of the blade both increase as the square of the rotational rate. They are most desirably counter-balanced to provide the wing with a pitch when the impeller is not rotating (the engine is off) of a slightly negative value as required to provide efficient autorotation descent. With such an arrangement, the aircraft will automatically convert into autorotation for descent in the event of a power failure.

A load can be carried by the aircraft without upsetting the pitch plane of the wing merely by attaching the load to the aircraft with its center of mass lying on the rotational axis 16. An attachment catch 20 (FIG. 3) is provided for securing such a load to the craft. The load might be, for example, a crop spraying or seeding apparatus or even a harness holding a man. It should be noted that assuming insignificant frictional at attachement point 25, it is not necessary to include a stabilizing tail rotor or the like, to prevent a load from rotating since the rotorcraft is driven without the transmission of rotary power through the attachment point.

The impeller 18 not only acts to set the pitch plane of the wing as aforesaid, but also generates air pressure for jet flow to power the aircraft. More particularly, upon rotation the impeller will draw air through the opening 21 and direct the same with an increase in pressure into a pickup scroll 22. The scroll 22, in turn, feeds the air into an inner duct 23 extending for the length of the wing 13. As illustrated in phantom in FIG. 2, a turning cascade 24 is provided within the duct adjacent the tip of the wing for diverting the air toward the wing's trailing edge where it is expelled, as indicated by the arrows 26. This jet flow at the wing tip will rotate the rotorcraft about the axis 16 passing through its center of mass.

Engine 19 is a two-cycle engine of the type commonly used to power, for example, chain saws or model airplanes, depending on the size of the craft. An engine of such type is particularly desirable in a rotorcraft because it is lubricated during operation by oil mixed with the fuel. That is, there is no need for an oil sump with this type of engine that could be seriously upset by centrifugal force.

The fuel system provided for the engine 19 is especially designed for use in such a rotorcraft. For one thing, the fuel tank 27 is located near the axis of rotation 16 of the rotorcraft to minimize centrifugal force on fuel contained therein, as well as to reduce the effect of weight changed due to fuel use on the stability of the craft. Also, to prevent centrifugal force on fuel flow from the tank 27 to the carburetor 28 associated with the engine from adversely affecting engine operation, means are provided for controlling such fuel flow. That is, the fuel tank is pressurized by connecting the same through line 29 with the crankcase of the engine 19. A check valve 31 is positioned within the line to prevent reverse flow of fuel due to pressure reductions in the crankcase.

A demand regulator 32 is provided in the intake line between the fuel tank 27 and the carburetor 28. The demand regulator is set to feed fuel to the carburetor as indicated by its suction, i.e., only as needed by the engine, in order to prevent centrifugal force in the fuel flow from flooding the engine or producing a sensitivity to rotational rate. While many conventional demand regulators are usable for this purpose, a simple one satisfactory for the present invention consists merely of a valve in the fuel line operated by a diaphragm which, in turn, is energized to open the valve when necessary by the suction pressure of the carburetor.

The fuel system for the engine 19 further includes a throttle lever 33 on the carburetor for controlling the speed of operation of the engine and thereby the height of flight of the rotorcraft. That is, an increase in engine power will result in greater jet flow 26 and a consequent faster rotational rate, within drag limits, for the rotorcraft. Because of the positive angle of attack to the plane of rotation presented by the wing when the craft is powered, such rotational rate will result in sufficiently greater lift to cause an upward movement of the plane of rotation. Changes in the throttle setting and thus of the height of flight can be caused by remote command. Further details of the preferred carburetor setting control will be described hereinafter.

The fuel system also includes a shutoff valve 34 communicating with the intake line 35. Such shutoff valve is also controllable by remote command via, for example, a relay valve 36.

All of the above described mechanical components, as well as those to be described hereinafter and the electrical control components, are appropriately located within the housing 12 and the wing 13 to satisfy the criteria set forth above with respect to efficient rotation of the rotorcraft about the axis 16.

The preferred embodiment of the invention also includes control means for overcoming the angular momentum of the impeller to change the plane of rotation of the aircraft, when it is desired to do so. More particularly, such control means includes a control flap 38 at the trailing edge of the wing adjacent its tip, i.e., at a location spaced laterally from the axes of rotation of the impeller and the aircraft. In accordance with well-known principles, the control flap can be used to change the scalar value of the lifting force in order to thereby produce a torque on the rotorcraft and the rotating impeller. The control flap is designed relative to the lifting force and speed of rotation of both the wing and the impeller to produce a torque which is sufficiently great to overcome the angular momentum of the impeller. Such lift change will thereby angularly change the plane within which the impeller rotates, and consequently change the attitude of the aircraft. It will be appreciated that the attitude of the plane of rotation of the aircraft controls its direction of movement in accordance with conventional rotor disc theory.

As is illustrated, the control flap 38 is located within the jet thrust of the aircraft. It will be appreciated that in such location, any movement of a control flap of a given size will have greater affect on the aircraft than one positioned on the airfoil at a location at which it will react only with the air passing by such airfoil. It will also be appreciated that means other than a mechanical control flap, e.g., a jet stream relying on the Coanda affect, can be used to selectively change the lifting force at a location spaced from the axis of rotation 16.

From the above, it will be seen that the aerodynamic requirements for the aircraft are of a low order of complexity and cost. For simplicity, the positioning of flap 38 is controlled by an air pressure system within the interior of wing 13. More particularly, as best shown in FIG. 7, a yoke 39 extending forwardly from the flap 38 is engaged by a driving pin 40 which, in turn, is rigidly secured to a coupling spring 41. The spring 41 is sandwiched between a pair of actuator bags 42 and 43.

Selective inflation and deflation of the bags 42 and 43 controls the position of the coupling spring and its driving pin and, hence, rotation of the flap on the pivot pins 44 securing the same to the wing 13. The center position of the flap, i.e., that position in which it does not divert the jet stream, is obtained by having both of the actuator bags 42 and 43 inflated. Deflation of either bag while the other bag is maintained inflated will result in movement of the flap 38. For example, deflation of the bag 42 while the bag 43 is maintained in its inflated position will result in the coupling spring 41 moving upward to pivot the flap 38 downward.

To simplify flap control, the time of flap actuation is varied rather than the angular degree to which the flap is pivoted. For example, when a small correction is desired in the rotor disc attitude, such correction is accomplished by a correspondingly small time at which the flap is pivoted to cause the correction. However, when a larger correction in the same direction is desired, a longer flap actuation time is provided by energizing the actuator bags at a greater length of time. The angular degree of flap movement is the same, however, in both cases.

Inflation and deflation of each of the bags 42 and 43 is respectively controlled by relay air valves 46 and 47 (FIG. 3). Each of such valves is a three-way valve capable of quickly applying pressure or venting the actuator bag with which it is associated. Air pressure for feeding the lines 48 and 49 with pressure through the valves is obtained, for example, from the duct 23 as is indicated by the feed line 50 for the valve 46 in FIG. 2. Of course, other sources of gas presssure could be used.

Operation of each of the valves 46 and 47 is controlled by relay armatures which, in turn, are controlled by a simple and yet highly effective sensor and control system incorporated into the preferred embodiment of the invention. Such control system synchronizes input from both sensors and detectors on the aircraft with remote command input to cause appropriate changes in the engine speed and the control flap positioning to obtain desired flight conditions. In this connection, the rotorcraft is typical of any rotating blade in that due to gyroscopic precession the control forces applied by the flap 38 must be applied approximately 90° ahead of the point in the wing's rotation at which ultimate deflection is desired. All sensors and detectors to be discussed are therefore arranged and positioned on the rotorcraft as required to satisfy such precessional requirements.

A detector is provided on the rotorcraft for determining its angular orientation in its plane of rotation at any selected time. As a particularly salient feature of the instant invention, it includes a quite simple and yet highly accurate detector for this purpose. More particularly, a magnetic conductor in the form of an electrical wire coil 51 is rigidly mounted within the housing as indicated in FIG. 2 for rotation with the rotorcraft. In accordance with known electromagnetic theory, movement of such a conductor across magnetic lines of force will result in an electrical force (voltage) being generated in such conductor. When such movement is a rotation, the current produced will be sinusoidal with a full wave being generated upon a rotation through 360°. The value of the current, i.e., its scalar value and slope at any particular time, will depend upon the angle of the coil in its plane of rotation relative to the field at such time. Thus, because such coil is mounted for rotation with the rotorcraft in its plane of rotation, the value of the generated current will also indicate the angular orientation of the rotorcraft in its plane of rotation relative to the magnetic lines of force, and thereby provide a direction reference base independent of the rotorcraft to which a commanded direction can be compared. In the present instance, the magnetic lines of force are those generated by the magnetic poles of the earth. A simple and yet effective angular orientation detector is thus provided. It should be noted that a mechanical force is also produced by the rotation of a magnetic conductor across magnetic lines of force. The value of such mechanical force will also vary with the orientation of the conductor and thus is also usable to indicate angular orientation of the rotorcraft.

The control system further includes means for receiving a command signal indicative of a direction of flight desired for the aircraft. In this connection, this specific embodiment of the invention is designed to respond to remote radio control of the type which transmits command information in the form of varying pulse width electrical signals. The command signal is divided into two separate components representing the desired direction and speed of travel of the aircraft along axes which are 90° apart. A pair of remote control receivers and decoder units 52 and 53 are provided for receiving the command signals and converting variations in the pulse width of the incoming signal to a change in a dc signal. One of the components is combined with the signal generated by the coil 51 to produce a control signal indicative of the timing and direction of changes in the scalar value of the lifting force required to change the plane of rotation of the craft to one conforming with the directional component represented by the command. More particularly, the receiver includes an integrator 54 which provides the desired dc signal. In order to provide a fail-safe method of control in case of inadvertent loss of communication with the aircraft, means are associated with the decoder unit 52 for providing a preselected setting whenever the input to the decoder unit falls to zero. That is, a pulse absent detector in the form of a rectifier and filter 56 detects the lack of input to the integrator 54 and controls the operation of a gate 57 which, in turn, sets the amplifier 58 to have a preselected output whenever the decoder unit 52 is not receiving a command signal. The preselected output one of which when combined with other signals to be described will command the aircraft to hover.

The dc signal from the decoder 52 is amplified by an amplifier 58, the output of which is applied directly and as inverted by an inverter 59 to the control inputs of an associated four quadrant multiplier 60. The sinusoidal current developed in the coil 51 is directed to the multiplier 60 as well, through an amplifier 62 whose output is fed both directly and through an inverter 63 to such multiplier. A zero reference voltage for the multiplier is directed thereto via terminal 64.

The voltage applied to the multiplier at the terminal 64 is selected to prevent the multiplier from developing an output when the input control voltage from the command signal amplifier 58 is equal thereto. The voltage 64 is also selected to be the center point between the outputs of the amplifier 62 and the inverter 63. With this arrangement, the output of the multiplier 60 appearing on the lines 66 and 67 when combined will provide a control signal having a phase, frequency, and amplitude indicative of a comparison between the signal generated by the rotating coil 51 and the command signal.

The second component of the desired direction of flight is compared with a signal which is in quadrature with the signal generated by the coil 51. Although such quadrature signal could be provided electronically, the most simple way of developing the same is merely to mount a second conductor coil in the aircraft in a orientation which is in quadrature to the coil 51. Such a second coil is represented in FIG. 8 by the reference numeral 68. The quadrature signal generated by it is fed to another four quadrant multiplier 61 through an amplifier 69 and an inverter 71. The multiplier 61 will combine the same with the output of the receiver and decoder unit 53 in a manner which is the same as that described above for the unit 52 and the multiplier 60. For this reason, the details of neither the decoder unit 53 nor the action of the multiplier 61 will be described in detail. It will be recognized, however, that its output signals appearing on lines 72 and 73, when combined, will produce a control signal having a phase, frequency and amplitude determined by the comparison of the signal generated by the coil 68 and the command signal component provided by decoder unit 53.

The output from the multipliers 60 and 61 appearing respectively on the lines 66, 67 and 72, 73 are combined at a summation point 74. The resultant combined signal will have a phase and amplitude at the rotational rate of the craft containing the information as to the heading and airspeed the vehicle should take. To illustrate this, FIG. 9A is included showing a typical sinusoidal signal generated by the rotating coil detector 51, and FIG. 9B shows a dc signal emanating from decoder unit 52 indicative of a desired direction of flight. The output of the multiplier 60 applied to the summation point 74 would then have the shape, frequency and amplitude of the signal shown by FIG. 9C.

If the multiplier output signals were fed directly to the control flap, the control system would be an open loop system in which the basic speed stability of the vehicle would be overcome by the cyclic operation of the flap. Therefore, to improve upon the basic control technique, means are provided for generating a signal indicative of the speed of flight of the aircraft in the desired direction of flight. The detector is, for example, a capacitive microphone 76 (FIG. 2) which is located within housing 12 and has a tubing 77 connecting the same with a location 78 at which it is desired to sample air flow with respect to the translational motion of the vehicle. It will be recognized that because the aircraft rotates during translational flight the pressure supplied to the microphone 76 by the tubing 77 will alternate between highs and lows as the detector passes through advancing and then retreating sides of the airstream. Thus, an alternating signal at the rotational rate of the rotorcraft is generated. The location 78 at which the tubing 77 communicates with the airstream is chosen relative to the phase of the signals generated by the coils 51 and 68 so as to have a phase in opposition to the resultant phase of the multiplier signals at the summation point.

The airspeed detector is positioned within one leg of an AC bridge circuit 79 whose output is fed to a rectifier to provide a response directly proportional to pressure and thus simplify calibration. The bridge is fed by a high frequency reference source 81. With this arrangement, when the aircraft is rotating but has no translation, the output on line 82 will be zero because of balancing of the bridge. However, when the vehicle has translation, the output on line 82 will have a frequency determined by the aircraft's rotational rate and a phase and amplitude which will result in cancellation of the combined signal at the summation point produced by the outputs on lines 66, 67 and 72, 73 when the desired speed in the direction of flight as commanded is reached. The summation point 74 acts, in effect, as means for combining the velocity signal with the orientation and command signals. Also, whenever a course correction is required because of a disturbing force acting on the aircraft, the phase of the airspeed signal will differ from the command input and thereby result in generation of an output control signal.

FIG. 9D illustrates a typical velocity indicative signal applied to line 82. Assuming that the output from the multiplier 61 associated with quadrature coil 68 and decoder unit 53 is zero, i.e., there is no component of the desired direction of flight in the quadrature direction, the directional control signal as modified by the airspeed indication signal will be the summation of the signals shown in FIGS. 9C and 9D. FIG. 9E illustrates the resulting closed loop control signal applied to the summation point 74. Of course, the waveform of the actual signal at point 74 will be affected by the other circuitry connected to such point.

As an added feature, the control system further includes a detector for detecting the presence of an obstacle in the path of flight of the aircraft, and means responsive to such detection by generating an anti-collision signal which is also directed to the summation point to remove any component from the control signal thereat which would result, if unchanged, with the aircraft colliding with the obstacle. More particularly, an ultrasonic source 84 (FIG. 2) is positioned as shown for projecting outward from the aircraft an ultrasonic detection beam, and a detector 86 (FIGS. 2 and 8), such as a directional microphone, is positioned circumferentially of the housing about 90° from the source 84 for detecting reflections of the source signal from obstacles. Most desirably, both the source beam and the detector beam have widths, e.g., a 60° half-power beam width, which will overlap slightly to provide sensitivity to obstacles close to the aircraft. The positions of the source and detector relative to the orientation and position of the other detectors and sensors is chosen to cause any signal generated because of the sensing of an obstacle to oppose the command signals applied to the summation point 74. Thus, if the command channels are commanding "hover" and therefore the multipliers 60 and 61 are providing zero voltage input into the summation point, any signal generated by the ultrasonic detector will produce a motion away from the obstacle causing the signal generation. If, however, the aircraft is operating under a command signal which directs the same to move toward the obstacle, the aircraft will respond by continuing such movement until the anti-collision signal equals the command signal, and then by hovering. It will therefore be seen that the speed command automatically becomes a position command when an obstacle is in range. Small obstacles off the path of the vehicle will cause the vehicle to veer around them while large targets directly in the path will stop the aircraft at a distance therefrom determined by the speed command input. It should be noted that the anti-collision system of the invention is simply convertible into an "attack" system causing the aircraft to attack any obstacle or other object in its path, rather than avoid the same. That is, merely inverting the anti-collision signal applied to the summation point will cause any detection signal emanating from the detector 86 to direct control flap firing to move the vehicle toward the object, rather than away from the same. Moreover, the speed of approach to the object will increase as the distance to it decreases since the amplitude of the detection signal will vary inversely with such distance. It will further be recognized that an inverter in the line can be rendered active only when it receives a command signal energizing the same. Thus the same aircraft can have either an anti-collision or attack feature.

In order to assure that spurious control flap operation is not caused by components other than the fundamental frequency component of the control signal produced at the summation point 74, the control signal is passed through a band pass filter 91 prior to its application to the relays controlling valves 46 and 47. Most available band pass filters, however, generally cause varying phase shifts in the passed signal. Since, the phase of the control signal will control the timing of the flap firing, uncontrolled variations in such phase must be eliminated for best results. The band pass filter 91 is therefore designed to eliminate such phase shift variations. Also, because the frequency of the filter must be tuned to track the rotational rate of the aircraft, the band pass filter 91 is tied to such rotational rate The control signal is fed through an amplifier 92 having an associated feedback network 93 producing a subsidiary band pass filter. A second amplifier 94 and its feedback network 96 producing a second subsidiary band pass filter are accurately centered on the frequency of rotation of the aircraft by the generation of a correction voltage for this purpose. This same correction voltage is also fed to amplifier 92 which passes the control signal to thereby provide the desired tuning.

To the above ends, the input to amplifier 94 is fed via line 97 from the signal generated by the coil 51 whose phasing is determined by the rotational rate of the aircraft. The output of the amplifier 94 is fed to a phase detector 98 which is controlled by a gate 99. The gate receives via line 101 the signal generated by the coil 68. This signal is 90° out of phase with that fed from the coil 51 to the amplifier, and when the phase detector 98 indicates a difference between the input and output phase of the amplifier 94, the gate 99 passes a correction voltage from the phase detector through line 102 to the inputs of a pair of tuning controls, e.g., field effect transistors. The outputs of the tuning control 104 is directed to the feedback network 96 to correct the tuning of amplifier 94. The output of tuning control 103, on the other hand, is directed to the feedback network 93 to apply the same correction voltage to the band pass filter amplifier 92. The band pass filter defined by the amplifier 92 on the feedback network 93 is matched to the slave band pass filter defined by the amplifier 94 and the feedback network 96. Thus, only those components of the control signal which are in phase with the signal generated by the coil 51 and, hence, of the proper phase for the control signal, will be passed by the amplifier 92.

The control signal is then passed through a dc blocking capacitor 106 to means for applying the same to the relay coils of the valves which control movement of the flap and, hence, changes in the plane of rotation of the aircraft. The means 107 includes a pair of actuating amplifiers 108 and 109 associated with the vales 46 and 47, respectively. The amplifier 108 is fed directly by the control signal, whereas the control signal is first inverted by an inverter 111 prior to its application to the actuating amplifier 109.

Each of the amplifiers 108 and 109 is a clipping amplifier whose threshold is set by a rectifier and filter 112. The purpose for including the rectifier and the filter is twofold. For one, as the control signal input increases, the rectifier will provide an increased clipping threshold. Such increased threshold thereby enables the time of firing of the respective valves associated with the amplifiers from exceeding about 90° of the aircraft rotational angle. Thus, operation of the control flap is confined to the portion of the rotor disc that produces the most torque for repositioning the plane of rotation, without suffering excessive power loss. The increased clipping threshold provided by the rectifier also acts, in effect, as a lead network which stabilizes the overall aircraft control stability. That is, because of the time varying threshold, the output of the amplifier will represent a greater reaction to relatively fast control signal changes, as opposed to steady state controlled signals. More particularly, when a momentary signal is fed into the circuit the output firing time is initially greater than when equilibrium is established. The aircraft thus anticipates sudden motion or control inputs.

As mentioned previously, the height at which the aircraft flies can be controlled by remote input to the carburetor throttle. Such a remote command is represented in FIG. 8 by command signal line 113 leading to a throttle servo 114. It is also desirable for the control system to include means for automatically controlling the height at which the aircraft flies over the ground or other surface. To this end, a height sensing detector in the form of an ultrasonic source 115 (FIG. 4) and reflection detector 116 (FIGS. 4 and 7) are positioned at the bottom of the housing to enable generation of a signal indicative of the height of the aircraft at any particular time. The output of the detector is fed to an ultrasonic band pass filter 117 and is then rectified by rectifier 118. The resulting signal is then passed through a second band pass filter 119 tuned to the rotational rate range of the craft so as to remove engine and the like noise on it. The output of the band pass filter is then rectified to provide a dc signal by a rectifier 121 and combined with the command information to control operation of the throttle 33 through the throttle servo 114.

With this arrangement, the throttle actuator is controlled directly by the command channel until such time as an echo is received from the detector and then the output of the rectifier modifies the feedback within the throttle servo 114 to increase the throttle setting relative to the command signal and thereby cushion the descent of the vehicle. It will be noted that the reflected signal received by the detector 116 will be somewhat affected by the reflection characteristics of the ground or other surface which is detected. In this connection, the detector 116 is most simply merely an amplitude sensor, rather than a timed return sensor. However, by proper selection of beam angle and position of the source detector, a good height control is achieved. A source and detector beam of 90° width has been found satisfactory when both the source and detector are aimed approximately 60° from the vertical axis.

From the above description of the control system, it is seen that the command functions necessary from an operator are reduced to heading, airspeed and height. Moreover, if the operator's completely inattentive, the aircraft will hover in one location and await commands.

While the invention has been described with respect to a preferred embodiment thereof, it will be recognized by those skilled in the art that various changes and modifications can be made without departing from its spirit. It is therefore intended that the coverage afforded applicant be limited only by the scope of the claim language and its equivalents.

What is claimed is:

1. An aircraft comprising a body from which a wing extends providing an airfoil surface for generating a lifting force for said aircraft upon being moved through a flowable medium; a mass confined by said body for rotation in a plane; means for varying the value of the lifting force provided by said airfoil surface at a location spaced laterally from the axis of rotation of said mass; means for rotating said mass at an angular velocity providing said mass with an angular momentum in said plane sufficiently great to overcome the inertia and opposing aerodynamics of the remainder of said aircraft to set a pitch for said wing; motive means for rotating said wing about an axis essentially parallel to the axis of rotation of said mass to pass said wing through a flowable medium for generating said lifting force for said aircraft, the direction of rotation of said wing being the same as that of said mass; detector means for determining the location of said wing at any selected time in its plane of rotation relative to a direction reference base independent of said aircraft; and control means responsive to the detection of said location by selectively operating said means for varying the value of said lifting force to produce a torque on said mass sufficiently great to overcome its angular momentum and thereby angularly change the plane within which said mass rotates and the consequent plane of rotation of said wing to a plane corresponding with a desired direction of flight for said aircraft.

2. The aircraft of claim 1 wherein said detector means for determining the location of said wing at any selected time in its plane of rotation comprises a magnetic conductor mounted stationarily with respect to said wing for rotation with said wing through 360° across the magnetic lines of force of a magnetic field of a known direction to thereby generate a force in said conductor producing a signal having a value at any instantaneous time indicative of the angular orientation of said conductor and hence of said rotating wing in its plane of rotation relative to said magnetic field direction.

3. The aircraft of claim 2 wherein said magnetic conductor is also an electrical conductor and said force generated by rotation thereof with said wing provides an electrical current signal having a value at any instantaneous time indicative of the angular orientation of said rotating wing with respect to said field.

4. The aircraft of claim 2 wherein said control means includes means for generating a command signal indicative of flight relative to said field desired for said aircraft, means for combining said signal indicative of the angular orientation of said wing with respect to said field with said command signal to produce a control signal indicative of the timing and direction of changes in the value of said lifting force required to change the plane of rotation of said wing by overcoming the angular momentum of said mass to a plane of rotation conforming with said desired direction of flight relative to said field, and means for applying said control signal to said means for varying said value of said lifting force to cause said change in said plane of rotation.

5. The aircraft of claim 4 wherein said command signal is also indicative of the speed of flight desired in said direction, and said control means further includes an air velocity detector for generating a signal indicative of the speed of flight of said aircraft in said desired direction of flight, and means for combining said velocity indicative signal with said orientation indicative signal and said command signal to produce a control signal indicative of the timing and direction of changes in said value of said lifting force required to change the plane of rotation of said wing to a plane of rotation conforming with both said desired direction of flight and said speed of flight in said direction.

6. The aircraft of claim 5 further including a detector for detecting the presence of an obstacle in the path of flight of said aircraft, and means responsive to said detection by generating an anti-collision which is superimposed upon said control signal to remove therefrom any component indicative of a plane of rotation of said wing conforming with a collision path with said obstacle.

7. The aircraft of claim 4 wherein said wing has an airfoil configuration providing a positive angle of attack relative to the plane of translational motion of said aircraft when said aircraft is undergoing powered flight; a height sensing detector is provided for generating a signal indicative of the height of said aircraft, and said control means further includes means for generating a command signal indicative of a desired height for said aircraft, and means responsive to said height indicating signal and said height command signal by changing the lift produced by said aircraft to correspond said detection of actual height of said aircraft with said desired height for said aircraft.

8. A synchronous system for controlling the direction of flight having a lift producing means for generating lift for said aircraft and power means for rotating said lift producing means in a plane about an axis comprising: means for varying the value of a lifting force on said lift producing means at a location thereon spaced from said axis to thereby cause the application of a torque to said lift producing means tending to change the plane of said rotation; means for generating a signal indicative at any instant of time of the location at such time of said lift producing means in its plane of rotation relative to a direction reference base independent of said aircraft; means for generating a command signal indicative of both a desired speed and direction of flight desired; an air velocity detector for generating a signal indicative of the speed of flight of said aircraft in said desired direction of flight; means for combining said air velocity indicative signal with said location indicative signal and said command signal to produce a control signal indicative of the timing and direction of change in said value of said lifting force required to change the plane of rotation of said lift producing means to a plane of rotation conforming with both said desired direction of flight and said speed of flight in said direction; and means for applying said control signal to said means for varying said value of said lifting force to cause said change in said plane of rotation.

9. The synchronous system of claim 8 further including a detector for detecting the presence of an obstacle in the path of flight of said aircraft, and means responsive to said detection by generating an anti-collision signal which is superimposed upon said control signal to remove therefrom any component indicative of a plane of rotation of said lift producing means conforming with a collision path with said obstacle.

10. The synchronous system of claim 8 wherein said lift producing means has a airfoil configuration providing a positive angle of attack relative to the plane of translational motion of said aircraft is undergoing powered flight, a height sensing detector is provided for generating a signal indicative of the height of said aircraft, and said control means further includes means for receiveing a command signal indicative of a desired height for said aircraft, and means responsive to said height indicating signal and said height command signal by changing the lift produced by said aircraft to correspond said detection of actual height of said aircraft with said desired height for said aircraft.

11. The synchronous control system of claim 8 wherein said means for generating a signal indicative of the location of said lift producing means in its plane of rotation includes an electrical conductor mounted for rotation with said flight producing means across the magnetic lines of force of a magnetic field whose direction is known to thereby generate a sinusoidal current signal indicative of the angular orientation of said conductor and hence said lift producing means in its plane of rotation relative to said magnetic lines of force.

12. The synchronous system of claim 8 wherein said command signal indicative of a direction of flight desired for said aircraft includes two separate quadrature components of said direction; said control means further includes means for generating a signal in quadrature with said location indicative signal and; said means for combining said generated signals and said command signals to produce a control signal includes a pair of four quadrature multipliers, one of which compares said generated signal with one of said directional component command signals and the other one of which compares said signal in quadrature with said generated signal with the other of said directional component command signals to produce said control signal.

13. The synchronous system of claim 8 wherein said means for applying said control signal to said means for varying said value of said lifting force to cause said change in said plane of rotation includes a band pass filter responsive to said generator signal indicative of the location of said lift producing means in its plane of rotation by passing only those components of said control signal in phase with said generated signal.

* * * * *